United States Patent
Kaethner et al.

(10) Patent No.: US 10,755,455 B1
(45) Date of Patent: Aug. 25, 2020

(54) METHOD FOR DIGITAL SUBTRACTION ANGIOGRAPHY, X-RAY FACILITY, COMPUTER PROGRAM, AND ELECTRONICALLY READABLE DATA CARRIER

(71) Applicant: Siemens Healthcare GmbH, Erlangen (DE)

(72) Inventors: Christian Kaethner, Forchheim (DE); Markus Kowarschik, Nuremberg (DE); Michael Manhart, Fürth (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/793,137

(22) Filed: Feb. 18, 2020

(30) Foreign Application Priority Data

Feb. 25, 2019 (DE) .................... 10 2019 202 514.5

(51) Int. Cl.
   *G06T 11/00* (2006.01)
(52) U.S. Cl.
   CPC ........ *G06T 11/008* (2013.01); *G06T 2210/41* (2013.01); *G06T 2211/404* (2013.01)
(58) Field of Classification Search
   CPC combination set(s) only.
   See application file for complete search history.

(56) References Cited

U.S. PATENT DOCUMENTS 7,432,924 B2 * 10/2008 Ohishi .................... A61B 6/481
                                                             345/419
9,754,390 B2 * 9/2017 Heigl .................... G06T 11/008
(Continued)

FOREIGN PATENT DOCUMENTS

| DE | 10139708 A1 | 2/2003 |
|---|---|---|
| DE | 102004004604 A1 | 9/2005 |
| DE | 102012205351 A1 | 10/2013 |

OTHER PUBLICATIONS

German Office Action for German Application No. 10 2019 202 514.5 dated Nov. 22, 2019, with English translation.

*Primary Examiner* — Tsung Yin Tsai
(74) *Attorney, Agent, or Firm* — Lempia Summerfield Katz LLC

(57) ABSTRACT

A method for digital subtraction angiography of a recording region of a patient is provided herein. The method includes recording at least one mask image of a recording region without using a contrast medium; recording a plurality of ill images after administration of a contrast medium; and determining result images by subtraction of one of the at least one mask image from respective fill images. As a function of automatically determined or user-provided image quality information describing a suitability of the at least one mask image in respect of different movement states in the recording region during recording of the at least one mask image and in the case of at least some of the fill images, in the case of non-suitability of the at least one mask image for at least one fill image of a non-suitability group, at least one further mask image is recorded and the suitability of the further mask image for the at least one fill image of the non-suitability group is checked automatically by a comparison algorithm in respect of the movement state. Additionally, following the existence of suitable mask images for each fill image of the non-suitability group, the recording of further mask images is terminated.

16 Claims, 3 Drawing Sheets

(56) References Cited

U.S. PATENT DOCUMENTS

| | | | | |
|---|---|---|---|---|
| 9,786,069 | B2* | 10/2017 | Schafer | G06T 11/006 |
| 10,255,695 | B2* | 4/2019 | Kowarschik | A61B 6/504 |
| 10,470,732 | B2* | 11/2019 | Baumgart | A61B 6/504 |
| 10,524,755 | B2* | 1/2020 | Kowarschik | A61B 6/5217 |
| 2003/0053600 | A1* | 3/2003 | Schmitz | G06T 5/50 |
| | | | | 378/210 |
| 2005/0171420 | A1 | 8/2005 | Boese | |
| 2008/0037844 | A1* | 2/2008 | Baumgart | G06T 5/50 |
| | | | | 382/130 |
| 2010/0215237 | A1* | 8/2010 | Ohishi | A61B 6/4464 |
| | | | | 382/131 |
| 2011/0135177 | A1* | 6/2011 | Ohishi | G06K 9/6201 |
| | | | | 382/130 |
| 2013/0261445 | A1 | 10/2013 | Ertel | |
| 2016/0005192 | A1* | 1/2016 | Royalty | G06T 11/003 |
| | | | | 382/131 |
| 2016/0048959 | A1* | 2/2016 | Kowarschik | A61B 6/481 |
| | | | | 600/425 |
| 2016/0171716 | A1* | 6/2016 | Schafer | G06T 7/0012 |
| | | | | 382/107 |
| 2016/0242724 | A1* | 8/2016 | Lavallee | A61B 6/0407 |
| 2016/0371862 | A1* | 12/2016 | Silver | A61B 6/032 |
| 2017/0345145 | A1* | 11/2017 | Nempont | G06T 7/0012 |
| 2019/0046145 | A1 | 2/2019 | Leghissa | |

* cited by examiner

5 X-ray facility
6 C-arm
7 X-ray tube assembly
8 X-ray detector
9 Examination table
10 Control facility 10 Control facility
11 Recording control unit
12 Subtraction unit
13 Comparison unit
14 Image quality checking unit
15 Allocation unit
16 Detection unit
17 Evaluation unit
18 Output unit
19 User interaction unit

METHOD FOR DIGITAL SUBTRACTION ANGIOGRAPHY, X-RAY FACILITY, COMPUTER PROGRAM, AND ELECTRONICALLY READABLE DATA CARRIER

The present patent document claims the benefit of German Patent Application No. 10 2019 202 514.5, filed Feb. 25, 2019, which is hereby incorporated by reference.

TECHNICAL FIELD

The disclosure relates to a method for digital subtraction angiography (DSA) of a recording region of a patient, wherein at least one mask image of the recording region is recorded without using a contrast medium, wherein after administering a contrast medium, a plurality of fill images is recorded, and wherein result images are determined by subtraction of one of the at least one mask image from respective fill images. In addition, the disclosure relates to an X-ray facility, a computer program, and an electronically readable data carrier.

BACKGROUND

Digital subtraction angiography has been known as a recording technique in medical imaging for a long time and is conventionally abbreviated to DSA. In digital subtraction angiography a recording region of a patient is recorded at least twice: once without the effect of contrast medium (mask image), and another time with the effect of contrast medium (fill image). If the mask image is subtracted from the fill image, a result image is produced, which may show only the contrast medium. In this way, information, for example, on the circulation may be obtained, with it also being known to collate temporal information by finally partially or completely capturing the flow of contrast medium through the recording region by way of a plurality of fill images. Digital subtraction angiography is conceivable here in both two and three dimensions, wherein the following statements primarily refer to 2D DSA.

One frequent problem with digital subtraction angiography, in particular 2D DSA, are artifacts in the result images, which are caused by patient movements between the acquisition of the mask image and of the fill image. If a mask image and a fill image show the recording region in different movement states, the anatomy to be subtracted therefrom dose not exactly match, so that residues thereof remain as edges or other artifacts in the result image. In particular, independently of the recording region and the type of movement, complex movement patterns may occur, which may be composed of the overlaying of a plurality of organs or other anatomical structures that move in different ways.

In order to compensate such movement artifacts, it has been proposed in the prior art to register a mask image by way of elastic registering, in particular therefore a deformable movement field, on the respective fill images. In an approach of this kind, as a rule, the movements of overlaid organs having different movement patterns are not adequately considered and therefore compensated, however.

In an alternative approach, a plurality of mask images is recorded in different movement states of the recording region and is manually allocated to optimally similar fill images. The manual allocation is very time-consuming, however, and it is not possible to provide that suitable mask images have been recorded for the movement state of each fill image.

SUMMARY AND DESCRIPTION

The scope of the present disclosure is defined solely by the appended claims and is not affected to any degree by the statements within this summary. The present embodiments may obviate one or more of the drawbacks or limitations in the related art.

The disclosure is based on the object of disclosing an improved possibility for reducing movement artifacts in result images of digital subtraction angiography.

This object is achieved by a method, an X-ray facility, a computer program, and an electronically readable data carrier.

A method of the type mentioned in the introduction provides that, as a function of automatically determined or user-provided image quality information describing a suitability of the at least one mask image in respect of different movement states in the recording region during recording of the at least one mask image and in the case of at least some of the fill images, in the case of non-suitability of the at least one mask image for at least one fill image of a non-suitability group, at least one further mask image is recorded and the suitability of the further mask image for the at least one fill image of the non-suitability group is checked automatically by a comparison algorithm in respect of the movement state. Following the existence of suitable mask images for each fill image of the non-suitability group, recording of further mask images is terminated.

The termination does not have to occur immediately after the existence of suitable mask images. Instead, it may be terminated earlier or later by a user and/or, for example, after a maximum time. However, recording of further mask images may be automatically terminated and/or information may be at least automatically output to a user to terminate recording of the further mask images when suitable mask images actually exist for each fill image of the non-suitability group. As an alternative to a pure suitability check, a quality assessment may also be made, as will be described in more detail below.

It is therefore proposed to initially retain a conventional recording sequence of digital subtraction angiography with the recording of mask images and fill images, with at least a mask image being recorded here. However, if after this recording, it is found that for at least some of the fill images the at least one mask image deviates too much in its movement state, further mask images may be recorded to obtain mask images in suitable movement states in order to acquire result images of an adequate image quality. Reference should be made at this point to the fact that in many cases such recording of further mask images will not be necessary as, in particular, in the case of the 2D DSA primarily being discussed here, it is customary to stimulate the patient to hold their breath during the recording of the fill images, so that, e.g., a suitable, sufficiently matching movement state in respect of the at least one mask image is provided. Image quality information specified by the user may result in this regard, for example, due to the observation that the patient still breathed during the recording of the fill images or is not capable of holding their breath sufficiently anyway.

Particularly advantageous in this connection is an embodiment in which the image quality information is automatically determined by a quality algorithm that compares the movement state of the fill images with that of the at least one originally recorded mask image. The comparison algorithm may be used as the quality algorithm because even the comparison algorithm ultimately attempts by way of comparison of the movement states of the fill images of the non-suitability group and of the movement state of a further mask image currently being recorded to establish whether the further mask image is suitable for one of these fill images, so that a sufficiently high-quality result image is produced. Therefore, the comparison algorithm is expediently used not only when recording the further mask images, but particularly advantageously also in the decision as to whether recording further mask images is even necessary.

In this way, a simple and automatic/automatable workflow results for generating DSA result image sequences having reduced movement artifacts. This allows, in particular, in more precisely explained embodiments, potentially higher diagnostic reliability, the avoidance of repeated acquisitions, and the optimization of beam and contrast medium doses.

In a particular development of the method, the comparison algorithm and/or the quality algorithm is used for automatic allocation of a mask image, which is most suitable based on the movement state of the recording region and which is to be subtracted, to each fill image. While with particular approaches in the prior art it was known to purposefully record a relatively large number of original mask images and to allocate them manually by visual comparison or visual evaluation of provisional result images to different fill images, this extremely time-consuming process that is subject to the subjectivity of the user is omitted and the present disclosure allows an automatic allocation and choice of an optimized mask image for the respective fill image, so that high-quality result images are obtained with much-reduced effort and much-reduced processing time.

Nonetheless, it is expedient within the scope of the present disclosure if in the case of non-suitability of the at least one originally recorded mask image for at least one fill image, information is output to a user, according to which, in particular, a decision is made by the user as to whether further mask images should be recorded. This means the DSA recording sequence is, as was previously also the case, started by the user. Following adjustment of the X-ray parameters, at least one mask image is recorded and then contrast medium is injected, wherein the injection of the contrast medium does not constitute part of the method described here, which is primarily directed at the comparison of movement states in respect of the recorded images/further mask images, in other words to the supporting image evaluation.

After and/or during recording of the fill images, a check is made by the quality algorithm, which may correspond to the comparison algorithm, as to whether movement occurs, in particular in other words, whether the movement state of at least one fill image deviates too greatly from the movement state of the at least one mask image. If this is the case, at least one fill image is added to the non-suitability group therefore, information may be output to the user that the image quality of the resulting result images is potentially limited. The information may also indicate that the acquisition may be continued, or even should be continued, in order to attain a better result in respect of the image quality. If acquisition is continued by the user, the further mask images then recorded are analyzed as to whether the then recorded further mask images exhibit a movement state which matches the fill images of the non-suitability group better than the previous mask images.

It should be noted at this point that, in particular, with automatic allocation of pairs of fill images and mask images best suited to the generation of high-quality result images, a corresponding sequence of result images may also be constantly generated and held in readiness, to which the user may have access. The user may then continuously assess for himself whether adequate image quality has been achieved as the corresponding result images, whenever a more suitable mask image is present among the further mask images, are updated accordingly and may be displayed for the user. For example, an embodiment is therefore conceivable in which a user continues recording of further mask images with constant evaluation of the continuously updated, provisional result images until he decides that the image quality is adequate and ends recording of further mask images.

In a particular development, the comparison algorithm and/or the quality algorithm determine a comparison measure for the movement states, in particular a total variation measure, and/or that a first artificial intelligence algorithm is used as the comparison algorithm and/or the quality algorithm. With conventional methods, it is therefore conceivable to determine a comparison measure, (for example, the "Total Variation"), wherein, for example, edges and/or other structures, which should be seen in the two images, are extracted and accordingly compared. Differences between fill images (e.g., due to the contrast medium) and mask images are considered accordingly. However, with the given complex problem, it may also be particularly advantageous to use a first artificial intelligence algorithm to perform the comparison, for example, to determine a comparison measure. The first artificial intelligence algorithm may be trained based on annotated training data, in particular by deep learning, and/or be a Convolutional Neural Network (CNN). The training data does not necessarily have to be actual results from digital subtraction angiography. Instead, it is also possible to use synthetic training data, for example, by modifying an image in respect of the presence of contrast and purposefully varying it for various differences in movement, so that the basic truth (e.g., comparison measure) exists. Methods, by which such synthetic training data may be generated particularly realistically, have been proposed already in the prior art.

A novel use of artificial intelligence or of machine learning of this kind during a DSA recording process results in a further improvement in the workflow as high-quality comparisons may be made quickly even in the case of more complex issues. Embodiments in which artificial intelligence/machine learning is used in respect of the comparison of the movement states and/or other method acts, may also be referred to as "aiDSA", as DSA expanded by artificial intelligence therefore.

In order to record further mask images, the contrast medium may have already left the recording region again, that further mask images which are actually free of contrast medium are generated therefore. For this purpose, one expedient development provides that at the beginning of recording for the further mask images an automatic check is made using at least one candidate image currently being recorded by an evaluation algorithm as to whether contrast medium is still in the recording region, wherein further mask images are recorded only after thus-established disappearance of the contrast medium from the recording region. In other words, the initially recorded candidate images are automatically analyzed as to whether the contrast medium has already fully disappeared from the recording region. As soon as no more contrast medium is present, matching of movement states by the comparison algorithm may be heeded. Artificial intelligence may also be used particularly advantageously when detecting whether there is still contrast medium present in the recording region, so that it may therefore be provided that a second artificial intelligence algorithm is used as the evaluation algorithm. It has been found that, owing to the complexity of the candidate images in respect of the presence of the contrast medium, whose attenuation properties may be much lower than the attenuation properties of diverse anatomical structures or may lie in the region thereof, are extremely complex to analyze, so that the use of artificial intelligence is particularly expedient here. In any case, it is expedient if the evaluation algorithm takes into account at least one structural property of the candidate image. Certain structural properties, which the evaluation algorithm may take into account accordingly, may exist during the dispersal of contrast medium in the blood vessel systems of a patient. The scope of the present disclosure may expediently also include, moreover, analyzing a sequence over time of directly successively recorded candidate images by way of the evaluation algorithm since the dispersal properties of contrast media over time may be considered in this way likewise for more reliable detection of contrast medium.

In respect of the embodiment as a second artificial intelligence algorithm, the second artificial intelligence algorithm may be trained based on annotated training data, in particular by deep learning, and/or may be a Convolutional Neural Network.

As has already been indicated, various termination criteria are conceivable, wherein, in addition to the beginning of recording of further mask images, in many cases, it is expedient to place termination of recording of further mask images in the hands of the user, in particular, when constantly updated provisional result images with the most suitable pairs of mask images or fill images are present and displayed anyway. Nonetheless, it may be expedient to inform the user about expedient termination instants.

It may thus be provided that when a quality criterion that indicates at least the presence of a suitable mask image for each fill image is satisfied, a recommendation is made to a user to terminate recording of further mask images. Specifically, it may be provided here that in the quality criterion, (e.g., by using the comparison algorithm and/or artificial intelligence), a quality standard is determined for the currently resulting result images, which has to exceed a threshold value in order to satisfy the quality criterion. Therefore, a particular quality may also be sought, which may be specified, (e.g., in the form of the threshold value), by a user and/or may also be automatically defined. In such a context, the user may expediently still continue to be master of recording activity, for which purpose, as already discussed several times and as is generally expedient, constantly updated, provisional result images may be generated and displayed for the user based on the pairs of mask images and fill images that currently best match in the movement states, by way of corresponding subtraction. Therefore, a user may optionally also already terminate recording of further mask images in the case of, in the user's view, adequate quality, before reaching the quality criterion.

In a particularly advantageous embodiment, in order to record the further mask images, low-dose images may be recorded with a low X-ray dose, at least for a time. The movement state in each case of a current low-dose image is compared with the movement state of each fill image of the non-suitability group, for which there is still no further suitable mask image, by way of a trigger algorithm. In the case of a trigger criterion relating to a sufficient match of the comparison result satisfying movement states, further mask images are recorded with the dose of the originally recorded mask images. It is particularly expedient to also record the candidate image as low-dose images already for the purpose of monitoring whether there is still contrast medium in the recording region, with it then being particularly expedient to use a second artificial intelligence algorithm as the evaluation algorithm. To reduce the X-ray dose, further mask images (or candidate images) may firstly be recorded with a much-reduced X-ray dose. As soon as a low-dose image without contrast medium and with suitable movement state is detected, the recording parameters are changed immediately to the recording parameters of recording of the original mask images (and fill images), so that further mask images may be produced.

A third artificial intelligence algorithm may expediently be used as the trigger algorithm, it being possible for this third artificial intelligence algorithm to be at least related to the first artificial intelligence algorithm, for example, an only partially unparameterized CNN of the first algorithm may be used as the third algorithm as both the first and third artificial intelligence algorithms involve comparing movement states in images, wherein, for the low-dose images, a much lower X-ray dose is to be compared with a higher X-ray dose, however. It may be provided that the third artificial intelligence algorithm is trained based on annotated training data, in particular by deep learning, and/or is a Convolutional Neural Network.

It is also particularly expedient in this context when, during recording of further mask images, the comparison algorithm monitors whether there is an excessive deviation from the movement states of the fill images of the non-suitability group, for which no suitable further mask image has yet been recorded. In the case of an excessive deviation that satisfies a regression criterion, recording of low-dose images is continued again. In other words, when the region of suitable movement states is left again, the dose may be returned to again in order to reduce X-ray dose on the patient.

To increase the probability that when recording the further mask images, suitable mask images are found for the fill images of the non-suitability group. It may be provided that when recording further mask images, a higher image recording rate is used than when recording the original mask images and/or the fill images. In this way, the discovery of mask images with optimally suitable movement state is simplified.

With a remaining deviation of the movement states of a fill image that exceeds a threshold value and of a most suitable mask image, a movement compensation algorithm may expediently be used for at least partial compensation of the deviation. In other words, the method presented here may also be combined with existing algorithms for movement compensation.

In a particularly advantageous development, a detection algorithm for the detection of a region of interest in the recording region is used by evaluation of at least some of the fill images and/or, optionally provisional, result images. The comparison of movement states by way of at least one of the comparison algorithm, the quality algorithm or the trigger algorithm is limited to the region of interest. Expediently, a fourth artificial intelligence algorithm may be used as the detection algorithm. Here too, the fourth artificial intelligence algorithm may be trained based on annotated training data, in particular by deep learning, and/or is a Convolutional Neural Network. It is also conceivable, moreover, that the region of interest is specified based on a user input. In other words, particularly interesting regions, (e.g., stenoses, aneurysms or the like), may be identified in the fill images or result images by machine learning or by user input. The allocation of mask and fill images may be optimized to the avoidance of artifacts in the selected region. This has the advantage, (e.g., during comparison), that irrelevant image sections do not affect, for example, comparison measures that are used which characterize the variable in respect of the movement state.

In addition to the method, the present disclosure also relates to an X-ray facility for digital subtraction angiography, having a control facility designed for carrying out the method. All statements in respect of the method may be transferred analogously to the X-ray facility with which the advantages already mentioned may likewise be obtained therefore.

The control facility may expediently include at least one processor and/or at least one storage device. To carry out the acts of a method, various functional units and/or sub-units may be defined by hardware and/or software, for example, in addition to a recording control unit and subtraction unit already present, at least one image quality checking unit for checking the existence of suitable mask images, a comparison unit, which, in addition to the comparison algorithm, may also be used for the quality algorithm, and the like. In particular, when optimum pairs of mask images and fill images are to be allocated to each other, an allocation unit may also be provided, which the comparison unit uses in particular. Corresponding functional units and sub-units may also be implemented in respect of further embodiments.

A computer program may be loaded directly into a storage a control facility of an X-ray facility and has program code to carry out the acts of a method when the computer program is run in the control facility of the X-ray facility. The computer program may be stored on an electronically readable data carrier, which therefore includes electronically readable control information stored thereon, which includes at least the computer program and is configured in such a way that it carries out a method when the data carrier is used in a control facility of an X-ray facility. The electronically readable data carrier may be, in particular, a non-transient data carrier, for example a CD-ROM.

BRIEF DESCRIPTION OF THE DRAWINGS

Further advantages and details of the present disclosure may be found in the exemplary embodiments described below and with reference to the drawings, in which.

DETAILED DESCRIPTION

Figure 1:
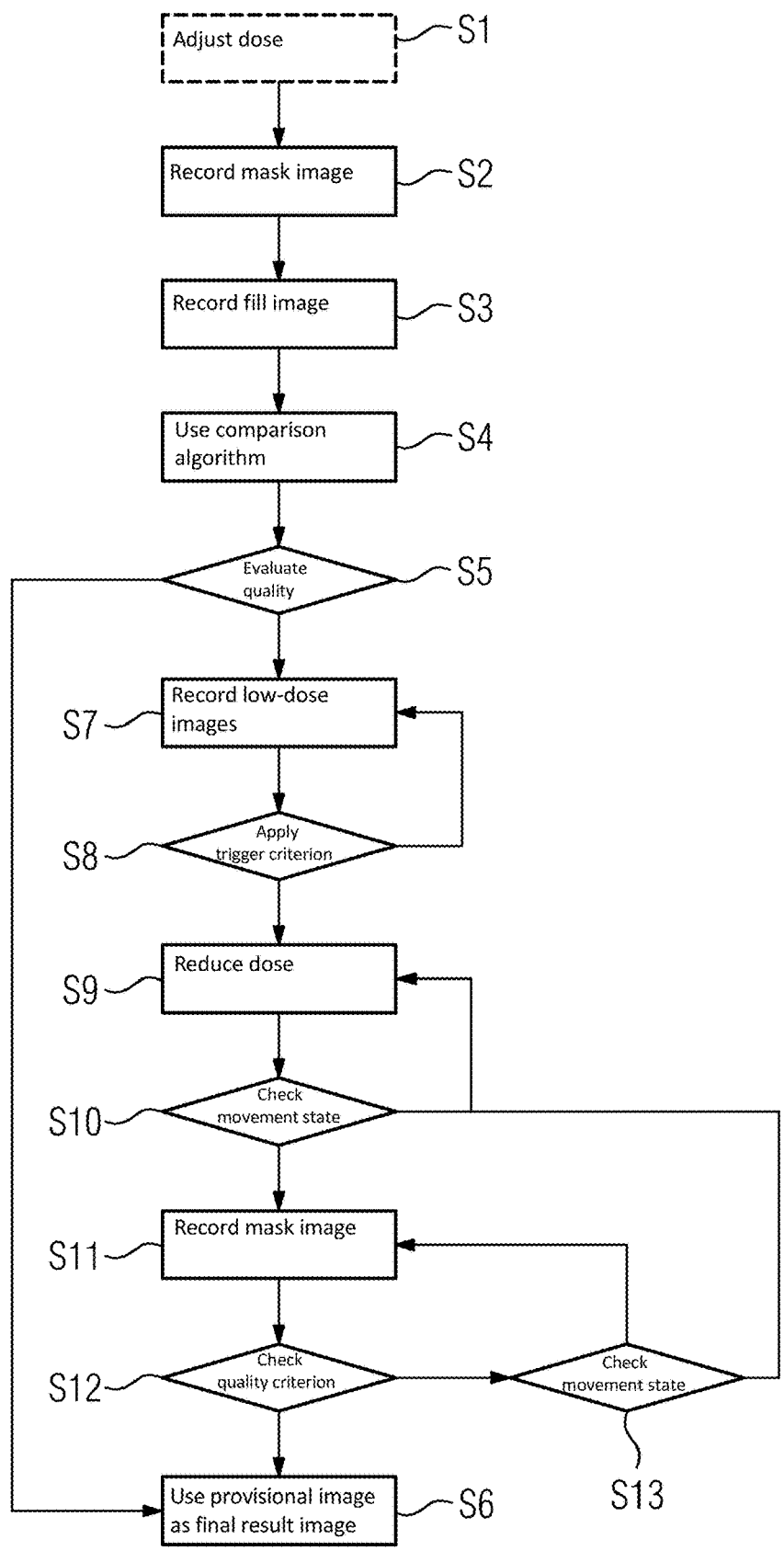
FIG. 1 depicts a flowchart of an exemplary embodiment of the method.

FIG. 1 depicts a flowchart of a method for carrying out digital subtraction angiography. In preparatory act S1, indicated only in broken lines, the dose is adjusted, as is known in the prior art. The result is an X-ray dose, which is to be used to record mask images and fill images of the recording region.

In act S2, at least one mask image is recorded, it being possible to also record a plurality of mask images, in particular in different movement states of the patient, (for example, three mask images). The mask images show the recording region of the patient without contrast medium being found therein, in particular, therefore without contrast medium flowing through the vessels of interest, (e.g., blood vessels), of the patient.

After administration of a contrast medium, which does not constitute part of the method, in act S3, as soon as the contrast medium reaches the recording region, fill images are recorded, which in their sequence over time in the present case depict at least the inflow of the contrast medium into the recording region.

To obtain result images, (e.g., which may only show image information about the contrast medium in the recording region), a mask image has to be removed from the respective fill image, so that the portions showing anatomy without contrast medium drop out. As the patient could possibly have moved, however, between recording of the at least one mask image in act S2 and recording of the fill images in act S3, or even during recording of the fill images in act S3, it is possible for the at least one mask image to show a different movement state in the recording region than the at least one fill image.

Therefore, in act S4, a comparison algorithm is used as the quality algorithm, which in the present case is configured as a first artificial intelligence algorithm, e.g., a Convolutional Neural Network (CNN). For one pair including mask image and fill image respectively, the comparison algorithm outputs a comparison measure, (for example, the total variation), with the comparison being made in respect of the movement states, and analyzes, for example, the position of (optionally overlapping) edges. An embodiment without artificial intelligence is also possible. When using the first artificial intelligence algorithm, this will have been trained by machine learning with training data, which contains present annotated pairs of mask image and fill image. In act S4, the comparison algorithm is used in two respects.

Firstly, there is an allocation of a mask image, which best matches in respect of the movement state, of the at least one mask image, in the present case in particular of the plurality of original mask images recorded in act S2 therefore, to each fill image, and this already enables provisional result images to be generated by subtraction. Secondly, however, image quality information is derived from the respective comparison measures, for example, in that for each pair of images that best match in terms of their movement state, it is checked whether matching of the movement states, in other words, the comparison measure, exceeds a threshold value. If this is not the case, the matching movement states are rather poor therefore, the corresponding fill image is added to a non-suitability group and the image quality information shows this accordingly.

It should also be noted at this point that in act S4, in particular, by using the provisional result images, a region of interest is manually and/or automatically also detected in the recording region, for example, a region of interest (ROI) containing an abnormality, (e.g., lesion or the like). A detection algorithm, (e.g., an artificial intelligence algorithm), may be used for automatic detection. Once a region of interest has been defined, the comparison of movement states is limited by the comparison algorithm (which is the quality algorithm in this case) and other comparisons that occur to the region of interest. This therefore provides with greater probability that the image quality in the region of interest is high.

As a result of the allocation, in act S4, in the present case in each case, provisional result images are produced by subtraction of the most suitable mask image from the respective fill image. A user may look at these at any time, in particular, in order to make their own assessment in respect of the quality.

In each case, in act S5, the image quality information is automatically evaluated by a non-suitability criterion, which, in the present case, when a fill image exists in the non-suitability group, provides that corresponding information is output to a user—that there is a clear deviation in movement for at least one fill image—which compromised the image quality of the result image sequence. In this case, it is recommended to the user to record further mask images. By studying the provisional result images, the user may also decide, however, that further recording of mask images, which tend to correspond to the fill images in the movement state, is desirable.

If, in act S5, the user decides against recording further mask images, the method proceeds to a concluding act S6 and the hitherto provisional result images are used as final result images.

However, if the user decides that further mask images of the recording region are to be recorded, which exhibit a better match of the movement state with the fill images of the non-suitability group, then, in act S7, the user begins to record low-dose images as candidate images. The low dose protects the patient from excessive exposure during recording of images, which would still not be suitable as further mask images anyway, because, by evaluating the low-dose images, it is checked in act S8 by an evaluation algorithm whether there is still contrast medium in the recording region. A second artificial intelligence algorithm is used here as the evaluation algorithm, and this takes into account at least one structural property of the candidate image, in order to be able to detect, for example, image structures formed by the presence of contrast medium.

The method continues with the act S7 for as long as contrast medium is still detected in the recording region. Once the contrast medium has disappeared from the recording region, further low-dose images are recorded in act S9 with the, compared to recording of the mask images in act S2 and the fill images in act S3, reduced dose. The image rate is increased in act S9, however, to increase the probability of finding suitable movement states for the fill images of the non-suitability group.

In act S10, a trigger algorithm is applied to the respectively current low-dose image, and this compares the low-dose image with the respective fill images in the non-suitability group in respect of the movement state. The trigger algorithm may be based here on the comparison algorithm, for example, by re-parameterization. This means, in particular, that the trigger algorithm may be a third artificial intelligence algorithm. In act S8, a trigger criterion is also applied, which, when the movement states sufficiently match in respect of at least one fill image of the non-suitability group, increases the X-ray dose to the level according to acts S2 and S3 and in act S11 begins with recording of at least one further mask image. If sufficient matching of the movement state is not determined, the method returns to act S9 in order to reduce the dose.

For each further mask image recorded in act S11, a check is made by the comparison algorithm for each fill image of the non-suitability group as to whether the movement states match sufficiently well to obtain a result image of the highest quality. If a particular quality criterion is satisfied, then at the latest when further mask images exist for all fill images of the non-suitability group, which satisfy this quality criterion, information is again output to the user who may then terminate recording of further mask images. In each case with the further mask images recorded in act S11, as described above, new provisional result images are constantly being determined and displayed or are available for display in order to provide the user with an adequate decision-making tool for terminating recording of further mask images.

The corresponding decision is made in act S12. If, for example, the quality criterion is satisfied for all fill images of the non-suitability group, recording of further mask images may be terminated and the provisional result images become the final result images in act S6.

If recording of further mask images is to be continued, a check is made in act S13 as to whether the current movement state is still similar enough to that of a fill image of the non-suitability group for which a further mask image is required. If this is the case, a new further mask image is recorded in act S11. If this is not the case, the dose is reduced again, and the method returns to act S9.

Figure 2:
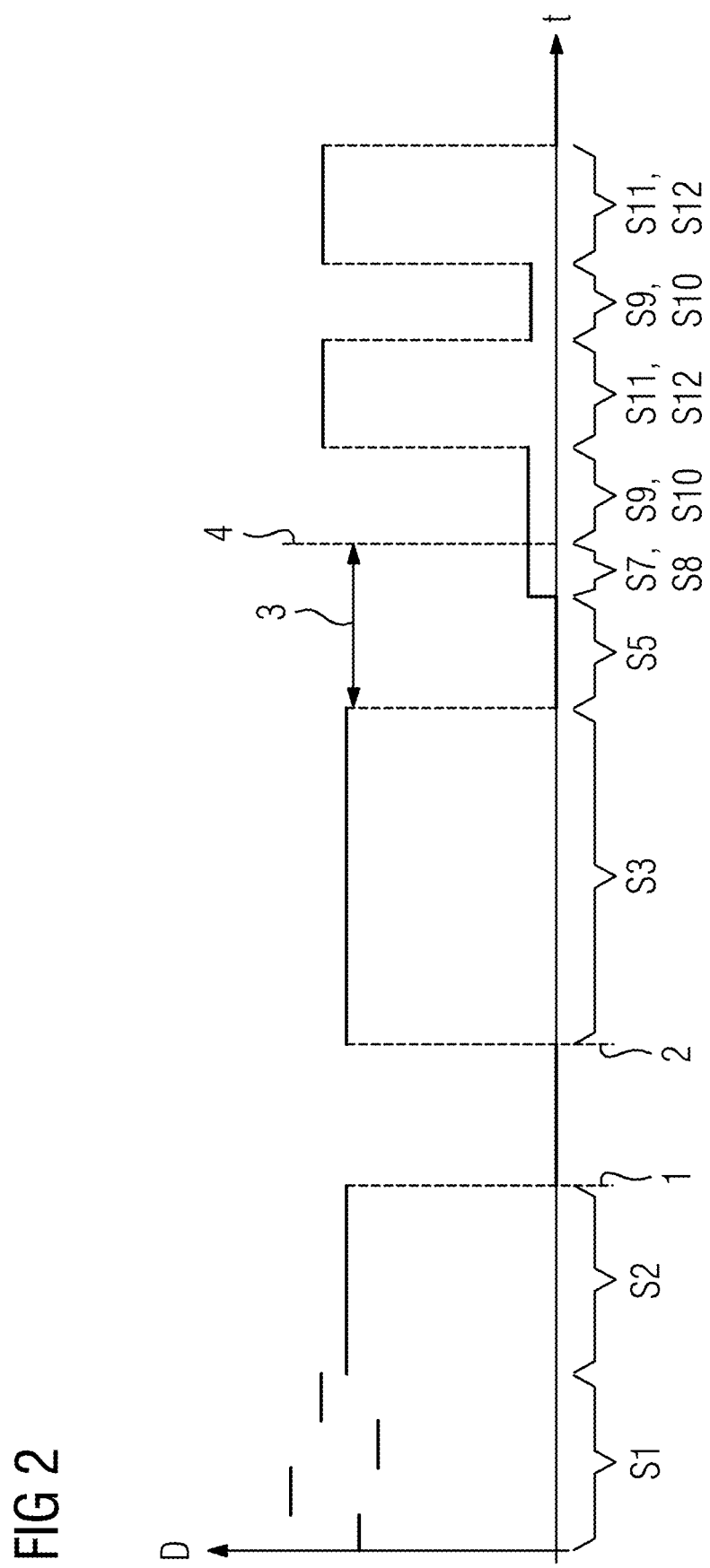
FIG. 2 depicts an example of a flowchart over time of the X-ray doses and algorithms used.

FIG. 2 depicts a schematic characteristic of the X-ray dose D over time t during an exemplary progression of the method according to FIG. 1. The corresponding acts, which are carried out in time intervals, are each shown. The dose is adjusted in act S1, for which reason correspondingly different X-ray doses are used. Following selection of the suitable X-ray dose, it remains relevant to recording of the mask images in act S2. The contrast medium is administered (not included in the method) at an instant 1, and this is expected at instant 2 in the recording region of the patient (Bolus Arrival Time—BAT). It should be noted that of course also low-dose images or the like may also be recorded between the instants 1 and 2 to detect the arrival of the contrast medium bolus.

After the arrival of the contrast medium bolus, the fill images are recorded in act S3, again with the X-ray dose defined at the end of act S1. The comparison algorithm (e.g., as a quality algorithm) may be used as early as during recording of the X-ray images in order to determine comparison measurements. It is also conceivable to carry out act S4 only after the conclusion of recording of the fill images, for which reason act S4 is not specifically characterized in the present case.

Following the conclusion of recording of the fill images, the X-ray dose drops accordingly to zero and act S5 is performed, in particular, also by retrieving the information from the user as to whether further mask images should be recorded. During this time, in the indicated period 3, the contrast medium disappears from the recording region again.

In the case shown in FIG. 2, the user had decided even before the complete disappearance of the contrast medium from the recording region to record further mask images, for which reason acts 7 and 8 are performed with a lower dose accordingly. At instant 4, it is established that there is no longer any contrast medium in the recording region and the method continues with acts S9, S10 accordingly.

If a suitable movement state according to the check in act S10 then exists, acts S11, S12 are performed accordingly with the X-ray dose defined at the end of act S1 until the movement state is left again and optionally acts S9, S10 may be used again, and this continues until mask images exist for each fill image which enable result images of sufficient quality with optimally few movement artifacts.

As already mentioned, the comparison algorithm (and therefore also the quality algorithm), the evaluation algorithm, the trigger algorithm, and also the optionally used detection algorithm are suitable for the use of artificial intelligence and machine learning, so that, ultimately, digital subtraction angiography using artificial intelligence (aiDSA) may ensue.

Figure 3:
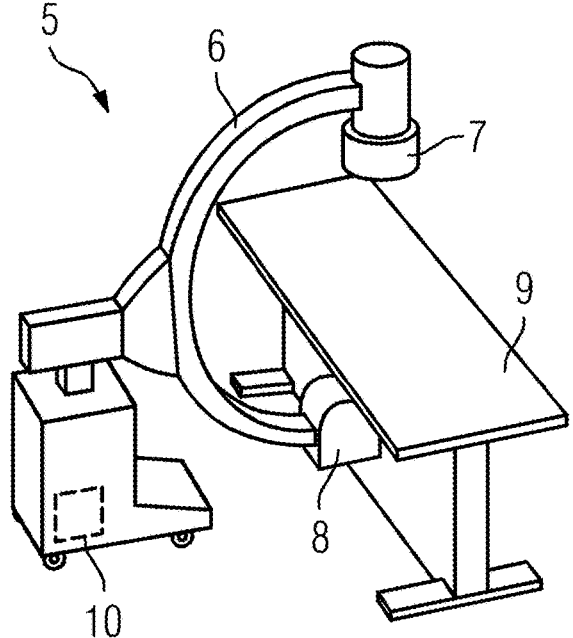
FIG. 3 depicts an example of an X-ray facility.

FIG. 3 depicts a schematic diagram of an X-ray facility 5, which includes a C-arm 6 on which, opposing each other, an X-ray tube assembly 7 and an X-ray detector 8 are arranged. In the angiography system formed in this way, the recording arrangement, formed of the X-ray tube assembly 7 and the X-ray detector 8, for recording a wide variety of recording regions and therefore vascular systems in respect of a patient positioned on the examination table 9, may be adjusted based on the degrees of freedom of movement of the C-arm 6 and its mobile design.

Operation of the X-ray facility 5 is controlled by a control facility 10, which in the present case is designed for carrying out the method, in particular, therefore the method of 2D DSA, as has been described in respect of FIGS. 1 and 2.

Figure 4:
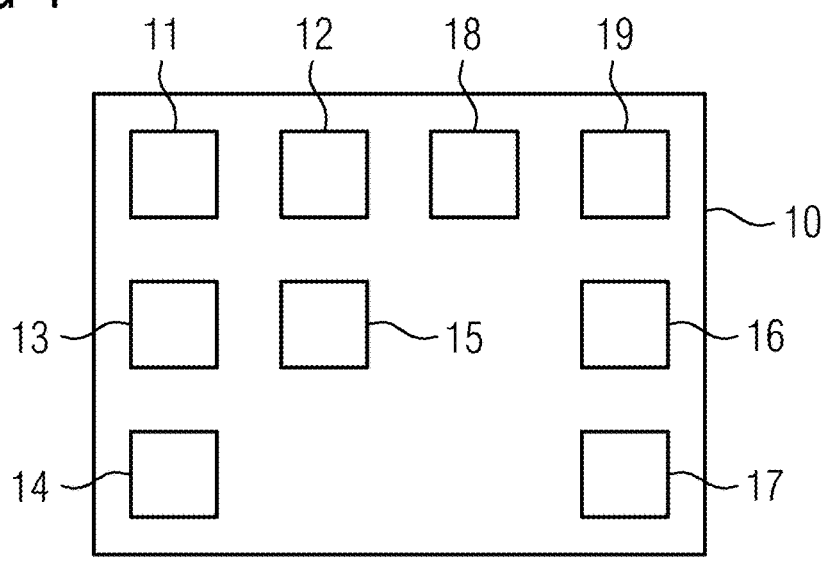
FIG. 4 depicts an example of the functional construction of a control facility of the X-ray facility of FIG. 3.

The functional construction of the control facility 10, which contains at least a processor and at least a storage device, is explained in more detail by FIG. 4.

The control facility 10 has a recording control unit 11 for controlling the recording of X-ray images and also for dose adjustment, which means, in particular, at least some of acts S1, S2, S3, S7, S9, and S11 may be performed by the recording control unit 11. The presence of a subtraction unit 12 for generating digital subtraction angiography result images is also already basically known in the prior art. The comparison algorithm (e.g., optionally also as the quality algorithm) is applied in a comparison unit 13, cf. act S4 and S11, S13, wherein the trigger algorithm according to act S9 may also be implemented therein. The results of the comparison unit 13 may be used in an image quality checking unit 14 (e.g., acts S4, S5, S11, S13 and optionally S10) to be able to make appropriate decisions on the basis of the comparison measure.

Furthermore, the comparison unit 13 may also be used by an allocation unit 15 in which the currently most suitable mask image is allocated to each fill image, also to generate the best possible provisional or final result images.

Further possible functional units of the control facility 10 include, for example, a detection unit 16 for performing the detection algorithm in order to be able to find a region of interest, and an evaluation unit 17, to be able to define, for example, the presence of contrast medium in the recording region in act S8. Furthermore, an output unit 18 for outputting provisional and final result images, and a user interaction unit 19 are provided, moreover. Additionally, further functional units and sub-units are also conceivable, moreover.

Although the disclosure has been illustrated and described in detail using the exemplary embodiments, the disclosure is not limited by the disclosed examples, and a person skilled in the art may derive other variations therefrom without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for digital subtraction angiography of a recording region of a patient, the method comprising:
  recording at least one original mask image of the recording region without using a contrast medium;
  recording a plurality of fill images following an administration of the contrast medium; and
  determining result images by subtraction of one mask image of the at least one original mask image from a respective fill image of the plurality of fill images,
  wherein, when the at least one original mask image is determined to be non-suitable for at least one fill image of a non-suitability group as a function of automatically determined or user-provided image quality information describing a suitability of the at least one original mask image in respect of different movement states in the recording region during the recording of the at least one original mask image and at least some fill images of the plurality of fill images, the method further comprises:
  recording at least one further mask image;
  automatically checking a suitability of the further mask image for the at least one fill image of the non-suitability group by a comparison algorithm in respect of the movement state; and
  terminating a recording of further mask images following an existence of suitable mask images for each fill image of the non-suitability group.

2. The method of claim 1, wherein the image quality information is automatically determined by a quality algorithm, which compares the movement state of the plurality of fill images with that of the at least one original mask image, wherein the comparison algorithm is used as the quality algorithm.

3. The method of claim 1, wherein the comparison algorithm, a quality algorithm, or both the comparison algorithm and the quality algorithm are used for automatic allocation of a mask image, which is most suitable based on the movement state of the recording region and which is to be subtracted, to each fill image of the plurality of fill images.

4. The method of claim 3, wherein, in a case of the non-suitability of the at least one original mask image for at least one fill image of the plurality of fill images, information is output to a user, according to which a decision is received from the user as to whether further mask images should be recorded.

5. The method of claim 2, wherein, in a case of the non-suitability of the at least one original mask image for at least one fill image of the plurality of fill images, information is output to a user, according to which a decision is received from the user as to whether further mask images should be recorded.

6. The method of claim 2, wherein the comparison algorithm, the quality algorithm, or both the comparison algorithm and the quality algorithm determine a comparison measure for the movement states, wherein the comparison measure is a total variation measure, and/or
  wherein a first artificial intelligence algorithm is used as the comparison algorithm, the quality algorithm, or both the comparison algorithm and the quality algorithm.

7. The method of claim 1, wherein, at a beginning of the recording of the further mask images, an automatic check is made using at least one candidate image currently being recorded by an evaluation algorithm as to whether the contrast medium is still in the recording region, and
wherein further mask images are recorded only after disappearance of the contrast medium from the recording region.

8. The method of claim 7, wherein a second artificial intelligence algorithm is used as the evaluation algorithm, and/or
wherein the evaluation algorithm takes into account at least one structural property of the candidate image.

9. The method of claim 1, wherein, in order to record the further mask images, low-dose images having low X-ray dose are recorded,
wherein the movement state in each case of a current low-dose image of the low-dose images is compared with the movement state of each fill image of the non-suitability group, for which there is still no further suitable mask image, by way of a trigger algorithm, and
wherein, in a case of a trigger criterion relating to a sufficient match of a comparison result satisfying movement states, the further mask images are recorded with the dose of the at least one original mask image.

10. The method of claim 9, wherein a third artificial intelligence algorithm is used as the trigger algorithm.

11. The method of claim 10, wherein, when recording the further mask images, the comparison algorithm monitors whether there is an excessive deviation from the movement states of the fill images of the non-suitability group, for which no suitable further mask image has yet been recorded, and
wherein, in a case of an excessive deviation that satisfies a regression criterion, the recording of the low-dose images is continued.

12. The method of claim 9, wherein, when recording the further mask images, the comparison algorithm monitors whether there is an excessive deviation from the movement states of the fill images of the non-suitability group, for which no suitable further mask image has yet been recorded, and
wherein, in a case of an excessive deviation that satisfies a regression criterion, the recording of the low-dose images is continued.

13. The method of claim 1, wherein when recording the further mask images, a higher image recording rate is used than when recording the at least one original mask image, the plurality of fill images, or both the at least one original mask image and the plurality of fill images.

14. The method of claim 2, wherein a detection algorithm for the detection of a region of interest in the recording region is used by evaluation of at least some fill images of the plurality of fill images and/or, optionally provisional, result images,
wherein the comparison of movement states by way of the comparison algorithm and/or the quality algorithm is limited to the region of interest.

15. An X-ray facility for digital subtraction angiography, the x-ray facility comprising:
a control facility configured to:

record at least one mask image of a recording region without using a contrast medium;
record a plurality of fill images following an administration of the contrast medium; and
determine result images by subtraction of one mask image of the at least one mask image from a respective fill image of the plurality of fill images,
wherein, when the at least one mask image is determined to be non-suitable for at least one fill image of a non-suitability group as a function of automatically determined or user-provided image quality information describing a suitability of the at least one mask image in respect of different movement states in the recording region during the recording of the at least one mask image and at least some fill images of the plurality of fill images, the control facility is further configured to:
record at least one further mask image;
automatically check a suitability of the further mask image for the at least one fill image of the non-suitability group by a comparison algorithm in respect of the movement state; and
terminate a recording of further mask images following an existence of suitable mask images for each fill image of the non-suitability group.

16. A non-transitory electronically readable data carrier, on which a computer program as stored, wherein the computer program, when executed, is configured to cause a control facility of an x-ray facility to:
record at least one mask image of the recording region without using a contrast medium;
record a plurality of fill images following an administration of the contrast medium; and
determine result images by subtraction of one mask image of the at least one mask image from a respective fill image of the plurality of fill images,
wherein, when the at least one mask image is determined to be non-suitable for at least one fill image of a non-suitability group as a function of automatically determined or user-provided image quality information describing a suitability of the at least one mask image in respect of different movement states in the recording region during the recording of the at least one mask image and at least some fill images of the plurality of fill images, the computer program is further configured to cause the control facility to:
record at least one further mask image;
automatically check a suitability of the further mask image for the at least one fill image of the non-suitability group by a comparison algorithm in respect of the movement state; and
terminate a recording of further mask images following an existence of suitable mask images for each fill image of the non-suitability group.

* * * * *